US005977510A

United States Patent [19]

Lindsay

[11] Patent Number: 5,977,510
[45] Date of Patent: Nov. 2, 1999

[54] NOZZLE FOR A PLASMA ARC TORCH WITH AN EXIT ORIFICE HAVING AN INLET RADIUS AND AN EXTENDED LENGTH TO DIAMETER RATIO

[75] Inventor: Jon W. Lindsay, West Lebanon, N.H.

[73] Assignee: Hypertherm, Inc., Hanover, N.H.

[21] Appl. No.: 09/067,770

[22] Filed: Apr. 27, 1998

[51] Int. Cl.$^{6}$ .................................................... B23K 10/00

[52] U.S. Cl. .................... 219/121.5; 219/75; 219/121.48

[58] Field of Search ................................ 219/75, 121.48, 219/121.5, 121.51, 121.39, 121.59, 74; 313/231.31, 231.4

[56] References Cited

U.S. PATENT DOCUMENTS

| | | | |
|---|---|---|---|
| 3,106,633 | 10/1963 | Skinner et al. | 219/75 |
| 3,106,634 | 10/1963 | Eschenbach et al. | 219/75 |
| 3,242,305 | 3/1966 | Kane et al. | 219/75 |
| 3,534,388 | 10/1970 | Ito et al. | 219/121.5 |
| 3,641,308 | 2/1972 | Couch, Jr. et al. | 219/121 P |
| 4,275,287 | 6/1981 | Hiratake | 219/121 PR |
| 4,361,748 | 11/1982 | Couch, Jr. | 219/121 PR |
| 4,389,559 | 6/1983 | Rotolico et al. | 219/121 PP |
| 4,421,970 | 12/1983 | Couch, Jr. | 219/121 PV |
| 4,521,666 | 6/1985 | Severance, Jr. et al. | 219/121 PY |
| 4,626,648 | 12/1986 | Browning | 219/121 PY |
| 4,743,734 | 5/1988 | Garlanov et al. | 219/121 PP |
| 4,762,977 | 8/1988 | Browning | 219/121.47 |
| 4,764,656 | 8/1988 | Browning | 219/121.44 |
| 4,777,343 | 10/1988 | Goodwin | 219/121.5 |
| 4,882,465 | 11/1989 | Smith et al. | 219/121.48 |
| 4,954,688 | 9/1990 | Wintefeldt | 219/121.5 |
| 4,967,055 | 10/1990 | Raney et al. | 219/121.5 |
| 5,164,568 | 11/1992 | Sanders | 219/121.5 |
| 5,220,150 | 6/1993 | Pfender et al. | 219/121.51 |
| 5,308,949 | 5/1994 | Reed, Jr. et al. | 219/121.5 |
| 5,317,126 | 5/1994 | Couch, Jr. et al. | 219/121.51 |
| 5,393,043 | 2/1995 | Couch, Jr. et al. | 219/121.5 |
| 5,591,356 | 1/1997 | Sakuragi et al. | 219/121.5 |

FOREIGN PATENT DOCUMENTS

| | | |
|---|---|---|
| 62-28084 | 2/1987 | Japan . |
| 62-33025 | 7/1987 | Japan . |
| 63-10082 | 1/1988 | Japan . |
| 1234-104 | 5/1986 | U.S.S.R. . |

OTHER PUBLICATIONS

Product Brochure for Prestozip 625; pp. 1–D45.

*Primary Examiner*—Mark Paschall
*Attorney, Agent, or Firm*—Testa, Hurwitz & Thibeault, LLP

[57] ABSTRACT

A plasma arc torch includes a torch body and a nozzle mounted relative to an electrode at a first end of the torch body to define a plasma chamber. The torch body includes a plasma gas flow path for directing a plasma gas from a plasma gas inlet to a plasma chamber in which a plasma arc is formed. The nozzle includes a hollow, body portion defining a cavity and a substantially solid, head portion formed integrally with the body portion defining an exit orifice extending from the chamber. The exit orifice has a converging inlet and an outlet, where the inlet has a radius of curvature, and the exit orifice has a length to diameter ratio of greater than 2.5.

17 Claims, 1 Drawing Sheet

NOZZLE FOR A PLASMA ARC TORCH WITH AN EXIT ORIFICE HAVING AN INLET RADIUS AND AN EXTENDED LENGTH TO DIAMETER RATIO

TECHNICAL FIELD

The present invention relates to plasma arc torches, and more particularly to an improved nozzle for use in plasma arc torches.

BACKGROUND

Plasma arc torches are widely used in the cutting of metallic materials. A plasma arc torch generally includes an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). Generation of the pilot arc may be by means of a high frequency, high voltage signal coupled to a DC power supply and the torch or any of a variety of contact starting methods.

One objective in the design and development of plasma arc torches is to improve the cutting speed of the torches. Several factors influence cutting speed including: cutting current; standoff height; plasma plenum pressure; and swirl strength. Another factor which influences the cutting speed is the shape and size of an exit orifice of the nozzle through which the plasma arc exits the torch.

The nozzle includes a hollow, body portion defining a cavity and a substantially solid, head portion formed integrally with the body portion. The head portion defines an exit orifice extending from the chamber. The exit orifice has an inlet and an outlet. The diameter of the cavity is typically several orders of magnitude larger than the diameter of the exit orifice. The inner profile of the cavity typically corresponds to the outer configuration of the electrode, which generally has a cylindrical or conical configuration. In prior art plasma torches, the inlet of the exit orifice is typically characterized by a sharp or square edge. In addition, the exit orifice typically has a length to diameter ratio of less than about 2.4. For example, a plasma arc torch manufactured and sold by Hypertherm, Inc. under the product name POWERMAX800 includes a nozzle having an exit orifice with a length to diameter ratio from about 1.8 to about 2.4. The POWERMAX800 torch has a maximum cutting speed of about 30 ipm (inches per minute). The nozzle in the POWERMAX800 torch has an exit orifice with a sharp edged inlet.

One consideration in designing a plasma arc torch involves minimizing the potential for "double arcing" which damages the electrode and the nozzle of the torch. Double arcing is the creation of two arcs, one between the electrode and the nozzle and a second arc between the nozzle and the workpiece. The likelihood of double arcing increases as arc constriction, which increases the temperature and voltage of the plasma arc, increases.

It is therefore an object of the present invention to provide an improved nozzle design for a plasma arc torch, which increases the maximum cutting speed of plasma arc torches without increasing the likelihood of double arcing during torch operation.

SUMMARY OF THE INVENTION

The invention features an improved nozzle design which results in an increased maximum cutting speed of a plasma arc torch, without increasing the likelihood of double arcing during torch operation.

In one aspect, the invention features a nozzle for a plasma arc torch. The plasma arc torch includes a torch body, and an electrode mounted in the body relative to the nozzle to define a plasma chamber therebetween. The nozzle includes a hollow, body portion defining a cavity and a substantially solid, head portion formed integrally with the body portion. The head portion defines an exit orifice extending from the cavity. The exit orifice has a converging inlet having a radius of curvature and an outlet characterized by a sharp corner. The exit orifice, which can be substantially cylindrical, has a length to diameter ratio greater than 2.5.

In one embodiment, the body portion and the head portion of the nozzle are generally cylindrical. In another embodiment, the body portion of the nozzle is generally cylindrical, while the head portion of the nozzle is conical. In one detailed embodiment, the exit orifice has a length to diameter ratio of greater than 3. In another detailed embodiment, the exit orifice has a length to diameter ratio within a range from about 3.3 to about 4.2. In another detailed embodiment, the ratio of the radius of curvature and a diameter of the exit orifice is greater than 0.25. In still another detailed embodiment, the ratio of the radius of curvature and a diameter of the exit orifice is about 1.

In another aspect, the invention features a plasma arc torch. The torch includes a torch body and a nozzle mounted relative to an electrode at a first end of the torch body to define the plasma chamber. The torch body includes a plasma gas flow path for directing a plasma gas from a plasma gas inlet to a plasma chamber in which a plasma arc is formed. The nozzle includes a hollow, body portion defining a cavity and a substantially solid, head portion formed integrally with the body portion defining an exit orifice extending from the chamber. The exit orifice has a converging inlet and an outlet, where the inlet has a radius of curvature. The exit orifice has a length to diameter ratio of greater than 2.5. The ratio of the radius of curvature and the diameter of the exit orifice is greater than 0.25. In another embodiment, the ratio of the radius of curvature and the diameter of the exit orifice is about 1.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

Figure 1:
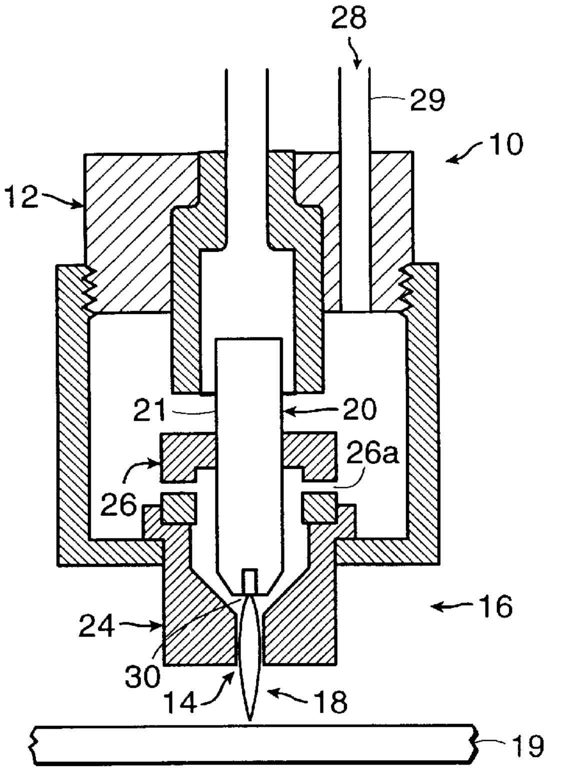
FIG. 1 is a cross-sectional view of one embodiment of a plasma arc torch according to the invention.

Referring to FIG. 1, a plasma arc torch 10 includes a body 12 which is generally cylindrical with an exit orifice 14 at a lower end 16. A plasma arc 18, i.e., an ionized gas jet, passes through the exit orifice and attaches to a workpiece 19 being cut. The torch is designed to pierce and cut metal, particularly mild steel, or other materials in a transferred arc mode. In cutting mild steel, the torch operates with a reactive gas, such as oxygen or air, as the plasma gas to form the transferred plasma arc 18.

The torch body 12 supports an electrode 20 having a generally cylindrical body 21. The torch body 12 also supports a nozzle 24 which is spaced from the electrode 20. The nozzle 24 has a central orifice that defines the exit orifice 14. A swirl ring 26 mounted to the torch body 12 has a set of radially offset (or canted) gas distribution holes **26*a*** that impart a tangential velocity component to the plasma gas flow causing it to swirl. This swirl creates a vortex that constricts the arc and stabilizes the position of the arc on the insert.

In operation, the plasma gas 28 flows through the gas inlet tube 29 and the gas distribution holes in the swirl ring. From there, it flows into the plasma chamber 30 and out of the torch 10 through the nozzle orifice 14. A pilot arc is first generated between the electrode 20 and the nozzle 24. The pilot arc ionizes the gas passing through the nozzle orifice 14. The arc then transfers from the nozzle 24 to the workpiece 19 for the cutting of the workpiece 19. It is noted that the particular construction details of the torch body 12, including the arrangement of components, directing of gas and cooling fluid flows, and providing electrical connections can take a wide variety of forms.

Figure 2:
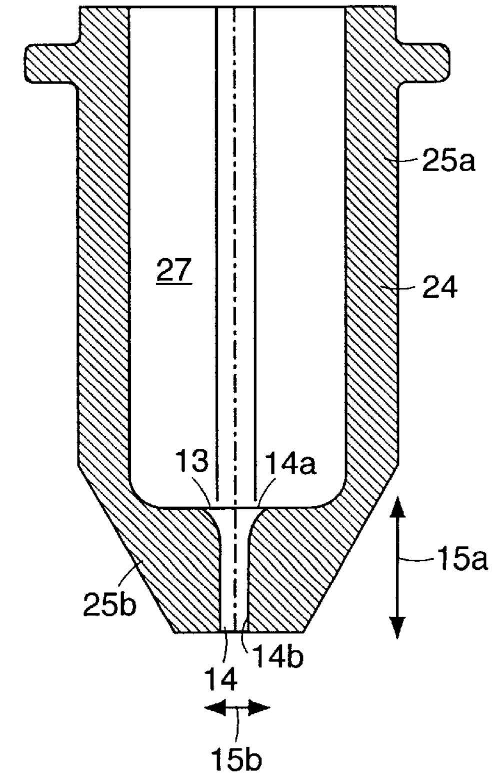
FIG. 2 is an enlarged cross-sectional view of the nozzle of the plasma arc torch of FIG. 1.

Referring to FIG. 2, the nozzle 24 includes a hollow, body portion **25*a* which defines a cavity 27. A substantially solid, head portion 25*b* formed integrally with the body portion 25*a* defines an exit orifice 14. The exit orifice 14 extends through the head portion and has an inlet 14*a* and an outlet 14*b*. In the embodiment of FIG. 2, the body portion 25*a* of the nozzle 24 is substantially cylindrical and the head portion 25*b* is substantially conical. In other embodiments, the body portion 25*a* includes a conical portion which extends into a conical head portion 25*b*. In still other embodiments, the body portion 25*a* and head portion 25*b*** are both substantially cylindrical.

In one embodiment, the exit orifice 14 has a length **15*a* to diameter 15*b* ratio of greater than 2.5. In another embodiment, the exit orifice 14 has a length 15*a* to diameter 15*b* ratio of greater than 3, and in still another embodiment, the length 15*a* to diameter 15*b* ratio is in the range from about 3.3 to 4.2. The increased length to diameter ratio improves the cutting speed of the plasma arc torch 10**. For example, experiments using Hypertherm's POWERMAX800 torch showed that an increased length to diameter ratio increased the maximum cutting speed. In the first set of experiments, a POWERMAX800 torch with an exit orifice length to diameter ratio in the range from 1.8 to 2.4 was used to cut a half-inch mild steel workpiece at a cutting current of 55 A. The maximum cutting speed using a nozzle with an exit orifice length to diameter ratio of 2.36 was 30 ipm. In the second set of experiments, a POWERMAX800 torch with an exit orifice length to diameter ratio in the range from 3.3 to 4.2 was used to cut a half-inch mild steel workpiece at a current of 55 A. The maximum cutting speed, using a nozzle with an exit orifice length to diameter ratio of 3.32, was 36 ipm. Thus, by increasing the exit orifice length to diameter ratio from 2.36 to 3.32, the maximum cutting speed increased by 20%. For these experiments, the plasma arc torch had an exit orifice diameter of about 0.044±0.0005 inches.

The extended exit orifice length to diameter ratio of the present invention is believed to advantageous over standard exit orifice length to diameter ratio for the following reasons. The plasma gas which enters the exit orifice approaches the inlet from a radial direction. As the plasma gas enters the orifice, a vena contracta forms which generates a constriction in the nozzle orifice inlet with recirculation regions forming near the exit orifice wall. After the fluid passes through this constriction, the fluid expands filling the exit orifice and forms a flow without any significant radial velocity component. A longer nozzle exit orifice ensures that fluid flow without any significant radial velocity component has been established prior to the fluid exiting the orifice. This type of flow produces an arc that is more columnar in shape which increases cutting speed. In addition, the longer exit orifice length keeps the arc constricted over a longer distance which increases the arc voltage and power, which also increase the cutting speed.

Although the increased length to diameter ratio improves the cut speed performance, the increased ratio could conceivably increase the occurrence of double arcing. By providing a converging inlet **14*a* having radius of curvature 13 to the exit orifice 14, the occurrence of double arcing is diminished. The radius of curvature 13 reduces the formation of a vena contracta and inlet constriction of the fluid flow, and consequently the occurrence of double arcing. The radius of curvature also increases the transfer height (i.e., the distance that a pilot arc transfers to a workpiece), since more plasma gas flowing through the exit orifice provides an additional force on the pilot arc to transfer the arc to the workpiece. In one embodiment, the radius of curvature 13 is selected such that the ratio of the radius of the curvature 13 and the diameter 15*b* of the exit orifice 14 is approximately 1. In general, the radius of curvature 13 can be greater than 25% of the diameter of the exit orifice 14**.

A POWERMAX800 torch with a nozzle having an exit orifice with an extended length to diameter ratio and a converging inlet with a radius of curvature was used to cut a half-inch mild steel workpiece. The nozzle had an exit orifice diameter **15*b* of about 0.043 inches, and the radius of curvature 13** of about 0.050 inches. The nozzle had an exit orifice length to diameter ratio of about 3.86. This torch provided a maximum cutting speed of about 45 ipm. It also eliminated or reduced the occurrence of double arcing.

Therefore, by increasing the ratio of exit orifice length **15*a* to diameter 15*b* and by providing a converging inlet 14*a* having a radius of curvature 13 to the exit orifice 14**, the nozzle design of the present invention increases the cutting speed without increasing the probability of double arcing.

EXPERIMENTS

The following experiments were performed to compare the maximum cutting speeds of a plasma arc torch having nozzles orifice (1) with and without an extended length to diameter ratio and (2) with and without an inlet radius of curvature. These experiments show that the maximum cutting speed of a plasma arc torch increases when the exit orifice length to diameter ratio is increased, and also that providing a converging inlet having a radius of curvature to the exit orifice reduces the likelihood of double arcing while maintaining the increased maximum cutting speed.

Experiment 1

A Hypertherm POWERMAX800 torch with a machine torch having a nozzle with a standard length exit orifice was used to cut three mild steel samples having a thickness of 0.5 inches under the following conditions at varying cutting currents:

plasma gas: shop air

Gas Pressure: 75 pounds per square inch gage (psig)

Gas Flow Rate: 280 standard cubic feet per hour (scfh)

Standoff: 1/36 inches

As shown in Table 1, a 20% increase in the cutting current only produced a modest 12% increase in the maximum cutting speed and the maximum speed ranged between 28.5 ipm to 32.0 ipm.

TABLE 1

Maximum Cutting Speeds of Torch with Regular Length Exit Orifice

| Cutting Current (A) | Ratio of Length to Diameter | Arc Voltage (V) | Maximum Speed (ipm) |
|---|---|---|---|
| 50 | 2.35 | 112 | 28.5 |
| 55 | 2.25 | 111 | 30.0 |
| 60 | 2.15 | 114 | 32.0 |

Experiment 2

A POWERMAX800 torch with a machine torch having a nozzle with an extended orifice length to diameter ratio was used to cut a half inch mild steel piece under the following condition:

| | |
|---|---|
| plasma gas: | shop air |
| Gas Pressure: | 70 psig |
| Standoff: | 0.062 inches |
| Cutting Current: | 55 A |

The ratio of exit orifice length to diameter was approximately 3.31. The maximum cutting speed was approximately 35 ipm.

Experiment 3

A POWERMAX800 torch with a hand torch having a nozzle with an extended orifice length to diameter ratio was used to cut half inch mild steel pieces under the following condition:

| | |
|---|---|
| Plasma Gas: | Shop Air |
| Gas Pressure: | 70 psig |
| Standoff: | 0.062 inches |
| Cutting Current: | 55 A |

The extended exit orifice had a length to diameter ratio of about 3.9. The maximum cutting speed ranged from 35 ipm to 36 ipm.

Experiment 4

A POWERMAX800 torch with a hand torch having a nozzle with an extended exit orifice length to diameter ratio and a converging inlet having radius of curvature was used to cut 0.5 inch mild steel pieces under the following condition:

Plasma Gas; Shop Air

Gas Pressure: 70 psig

Standoff: 0.062 inches

Cutting Current: 55 A

The extended exit orifice had a length to diameter ratio of about 3.9. The radius of curvature was around 0.050 inches. The torch was not shielded. The maximum cutting speed ranged from 36 ipm to 37 ipm. The results also showed no arcing or reduced arcing.

While there have been described herein what are to be considered exemplary and preferred embodiments of the present invention, other modifications of the invention will become apparent to those skilled in the art from the teachings herein limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A plasma arc torch comprising:

a torch body including a plasma gas flow path for directing a plasma gas from a plasma gas inlet to a plasma chamber in which a plasma arc is formed;

a nozzle mounted relative to an electrode at a first end of the torch body to define the plasma chamber, the nozzle comprising a hollow, body portion defining a cavity and a substantially solid, head portion formed integrally with the body portion defining an exit orifice extending from the chamber, wherein the exit orifice has a converging inlet and an outlet, the inlet having a radius of curvature and the exit orifice having a length to diameter ratio of greater than 3.

2. The plasma arc torch of claim 1 wherein the exit orifice has a length to diameter ratio in the range from about 3.3 to about 4.2.

3. The plasma arc torch of claim 1 wherein the ratio of the radius of curvature and the diameter of the exit orifice is about 1.

4. The plasma arc torch of claim 3 wherein the ratio of the radius of curvature and the diameter of the exit orifice is greater than 1.25.

5. The plasma arc torch of claim 1 wherein the body portion is generally cylindrical.

6. The plasma arc torch of claim 1 wherein the body portion includes a conical portion.

7. The plasma arc torch of claim 1 wherein the head portion is generally cylindrical.

8. The plasma arc torch of claim 1 wherein the head portion is generally conical.

9. The plasma arc torch of claim 1 wherein the nozzle is formed of an electrically conductive material.

10. A nozzle for a plasma arc torch having a torch body, and an electrode mounted in the body in relative to the nozzle to define a plasma chamber therebetween, the nozzle comprising:

a hollow, body portion defining a cavity; and a substantially solid, head portion formed integrally with the body portion defining an exit orifice extending from the chamber, the exit orifice having a converging inlet and an outlet, wherein the exit orifice has a length to diameter ratio greater than 3 and the inlet has a radius of curvature.

11. The nozzle of claim 9 wherein the exit orifice has a length to diameter ratio in the range from about 3.3 to about 4.2.

12. The nozzle of claim 10 wherein the ratio of the radius of curvature and the diameter of the exit orifice is about 1.

13. The nozzle of claim 12 wherein a ratio of the radius of curvature and the diameter of the exit orifice is greater than 1.25.

14. The nozzle of claim 10 wherein the body portion and the head portion are generally cylindrical.

15. The nozzle of claim 10 wherein the head portion is generally conical.

16. The nozzle of claim 10 wherein the body portion includes a generally conical section.

17. The nozzle of claim 10 wherein the nozzle is formed of an electrically conductive material.

* * * * *

UNITED STATES PATENT AND TRADEMARK OFFICE

CERTIFICATE OF CORRECTION

PATENT NO. : 5,977,510
APPLICATION NO. : 09/067770
DATED : November 2, 1999
INVENTOR(S) : Lindsay It is certified that error appears in the above-identified patent and that said Letters Patent is hereby corrected as shown below:

Column 6, line 48, claim 10, delete “the body in relative”, insert -- the body relative --.

Column 6, line 58, claim 11, delete “claim 9”, insert -- claim 10 --.

Signed and Sealed this

Twenty-sixth Day of February, 2008

JON W. DUDAS
*Director of the United States Patent and Trademark Office*